US008165448B2

(12) United States Patent
Braun

(10) Patent No.: US 8,165,448 B2
(45) Date of Patent: Apr. 24, 2012

(54) SYSTEM USING MULTIPLE DISPLAY SCREENS FOR MULTIPLE VIDEO STREAMS

(75) Inventor: Jeff Braun, Orinda, CA (US)

(73) Assignee: Hollinbeck Mgmt. GmbH, LLC, Wilmington, DE (US)

( * ) Notice: Subject to any disclaimer, the term of this patent is extended or adjusted under 35 U.S.C. 154(b) by 959 days.

(21) Appl. No.: 10/807,863

(22) Filed: Mar. 24, 2004

(65) Prior Publication Data

US 2005/0213946 A1    Sep. 29, 2005

(51) Int. Cl.
| H04N 5/775 | (2006.01) |
| H04N 5/46 | (2006.01) |
| H04N 5/84 | (2006.01) |
| H04N 5/225 | (2006.01) |
| H04N 5/765 | (2006.01) |
| H04N 5/932 | (2006.01) |
| H04N 7/00 | (2011.01) |
| H04N 7/01 | (2006.01) |
| H04N 7/18 | (2006.01) |
| H04N 7/20 | (2006.01) |
| H04N 9/80 | (2006.01) |

(52) U.S. Cl. ........ 386/230; 386/201; 386/234; 386/243; 386/332; 348/36; 348/118; 348/143; 348/148; 348/169; 348/441; 348/445; 348/556; 725/71; 725/74; 725/80; 725/82

(58) Field of Classification Search .............. 386/46, 386/83, 1, 230, 234, 332, E5.07, 201, 243; 725/55, 71, 74, 80, 82; 348/36, 169, 441, 348/445, E5.006, E5.111, E9.012, 556, 118, 348/143, 148, E7.086, E5.058, E5.112; 375/E7.268, 375/E7.278; 707/999.003, E17.009, E17.119; G9B/19.024, 27.012, 27.019, 27.017, 27.051
See application file for complete search history.

(56) References Cited

U.S. PATENT DOCUMENTS

| 4,975,771 | A |   | 12/1990 | Kassatly |
| 5,404,295 | A |   | 4/1995 | Katz et al. |
| 5,548,337 | A | * | 8/1996 | Kang ............................ 348/445 |
| 5,734,862 | A |   | 3/1998 | Kulas |
| 5,850,545 | A |   | 12/1998 | Matsushita |

(Continued)

FOREIGN PATENT DOCUMENTS

JP    07210174    8/1995

OTHER PUBLICATIONS

Bargeron, et al. "Annotations for Streaming Video on the Web", CHI'99 Extended Abstracts on Human Factors in Computing Systems, ACM Press, published 1999, pp. 278-279.

*Primary Examiner* — Thai Tran
*Assistant Examiner* — Syed Hasan
(74) *Attorney, Agent, or Firm* — Knobbe, Martens, Olson & Bear LLP

(57) ABSTRACT

Multiple video streams, or other image information, from a DVD or other single source are selectively directed among two or more display screens. The video streams can be directed automatically, manually or by a combination of automatic and manual techniques. This allows the streams to be viewed simultaneously on different display screens to, e.g., increase the viewing area, provide selectable enhancement and control of video viewing, or for other purposes.

35 Claims, 2 Drawing Sheets

U.S. PATENT DOCUMENTS

| | | | |
|---|---|---|---|
| 5,895,124 A | 4/1999 | Tsuga et al. | |
| 5,913,010 A | 6/1999 | Kaneshige et al. | |
| 5,923,627 A | 7/1999 | Miwa et al. | |
| 5,929,857 A | 7/1999 | Dinallo et al. | |
| 5,963,256 A | 10/1999 | Tahara | |
| 5,999,698 A | 12/1999 | Nakai et al. | |
| 6,006,241 A | 12/1999 | Purnaveja et al. | |
| 6,085,185 A | 7/2000 | Matsuzawa et al. | |
| 6,088,506 A | 7/2000 | Yoshio et al. | |
| 6,105,063 A | 8/2000 | Hayes, Jr. | |
| 6,173,287 B1 | 1/2001 | Eberman et al. | |
| 6,173,317 B1 | 1/2001 | Chaddha et al. | |
| 6,245,982 B1 | 6/2001 | Suzuki et al. | |
| 6,246,401 B1 | 6/2001 | Setogawa et al. | |
| 6,256,453 B1 | 7/2001 | Takano | |
| 6,263,346 B1 | 7/2001 | Rodriquez | |
| 6,289,165 B1 | 9/2001 | Abecassis | |
| 6,307,550 B1 | 10/2001 | Chen et al. | |
| 6,332,144 B1 | 12/2001 | deVries et al. | |
| 6,404,925 B1 | 6/2002 | Foote et al. | |
| 6,430,361 B2 | 8/2002 | Lee | |
| 6,430,609 B1 | 8/2002 | Dewhurst et al. | |
| 6,434,097 B1 | 8/2002 | Lewis et al. | |
| 6,449,653 B2 | 9/2002 | Klemets et al. | |
| 6,467,080 B1 | 10/2002 | Devine et al. | |
| 6,477,315 B1 | 11/2002 | Ohomori | |
| 6,498,620 B2 * | 12/2002 | Schofield et al. | 348/148 |
| 6,501,770 B2 | 12/2002 | Arsenault et al. | |
| 6,546,405 B2 | 4/2003 | Gupta et al. | |
| 6,687,211 B2 | 2/2004 | Sawabe et al. | |
| 6,731,185 B2 | 5/2004 | Taniguchi | |
| 6,789,109 B2 | 9/2004 | Samra et al. | |
| 6,806,885 B1 * | 10/2004 | Piper et al. | 345/545 |
| 6,898,799 B1 | 5/2005 | Jarman | |
| 6,954,419 B1 | 10/2005 | Kimura et al. | |
| 6,954,581 B2 | 10/2005 | Miller et al. | |
| 6,965,723 B1 | 11/2005 | Abe et al. | |
| 6,985,188 B1 | 1/2006 | Hurst, Jr. | |
| 7,151,214 B2 | 12/2006 | Barry | |
| 7,161,079 B2 | 1/2007 | Nishitani et al. | |
| 7,334,026 B2 | 2/2008 | Samra et al. | |
| 2001/0033736 A1 * | 10/2001 | Yap et al. | 386/46 |
| 2002/0032768 A1 | 3/2002 | Voskuil | |
| 2002/0092021 A1 * | 7/2002 | Yap et al. | 725/55 |
| 2003/0191776 A1 | 10/2003 | Obrador | |
| 2003/0236581 A1 | 12/2003 | Chambers et al. | |
| 2004/0073930 A1 * | 4/2004 | Demas et al. | 725/71 |
| 2004/0078215 A1 | 4/2004 | Dahlin et al. | |
| 2004/0102244 A1 | 5/2004 | Kryuchkov et al. | |
| 2004/0107439 A1 | 6/2004 | Hassell et al. | |
| 2004/0181592 A1 | 9/2004 | Samra et al. | |
| 2004/0201544 A1 * | 10/2004 | Love et al. | 345/1.1 |
| 2004/0220926 A1 * | 11/2004 | Lamkin et al. | 707/3 |
| 2005/0019015 A1 * | 1/2005 | Ackley et al. | 386/95 |
| 2005/0234958 A1 | 10/2005 | Sipusic et al. | |
| 2005/0262542 A1 | 11/2005 | DeWeese et al. | |
| 2006/0187305 A1 * | 8/2006 | Trivedi et al. | 348/169 |

* cited by examiner

SYSTEM USING MULTIPLE DISPLAY SCREENS FOR MULTIPLE VIDEO STREAMS

BACKGROUND OF THE INVENTION

This invention relates in general to playback of a visual production and more specifically to using multiple display screens to display multiple video streams.

Enjoyment of digital content is growing in popularity. Video and movies can be viewed from platforms such as computer systems, consumer digital devices such as video compact disc (CD), DVD players, and other displays, systems or platforms. Other formats, such as those promulgated by the Motion Picture Expert Group (MPEG) allow stored or streamed visual productions over digital networks.

Recent advances in display technology allow picture-in-picture displays of two or more video streams, or channels, on a single display device. A user, or viewer, of a television can select a primary channel and can also view other, secondary, channels in smaller windows on the single screen.

Multiple streams of video information obtained from stored media such as DVDs can also be displayed simultaneously. For example, U.S. Pat. No. 6,415,101 describes a video decoding system for retrieving multiple views from a DVD content source. The views can then be selectively displayed as primary and secondary views. The secondary views are displayed within sub-windows in the primary view.

Although these approaches allow enhancement of a user's viewing experience by simultaneously presenting multiple views of video, the approaches are limited in usefulness. Therefore it is desirable to provide improvements to the prior art to enhance and expand upon content viewing for entertainment, education, efficient presentation of information and other purposes.

BRIEF SUMMARY OF THE INVENTION

A preferred embodiment of the present invention allows multiple video streams, or other image information, to be selectively directed among two or more display screens. The video streams can be directed automatically, manually or by a combination of automated and manual techniques. This allows multiple video streams to be viewed simultaneously on different display screens to, e.g., increase the viewing area, provide selectable enhancement and control of video viewing.

In one embodiment the invention provides a method for directing two or more image streams to two or more display devices, the method comprising detecting a first video stream and associated first stream identification; detecting a second video stream and associated second stream identification; detecting a first display device and associated first display device identification; detecting a second display device and associated second display device identification; and directing the video streams to the display devices by using the identifications.

In another embodiment the invention provides a stream director for directing two or more image streams to two or more display devices, the method comprising a first input for a first video stream and associated first stream identification; a second input for a second video stream and associated second stream identification; a first output for a first display device and associated first display device identification; a second output for a second display device and associated second display device identification; and means for directing the video streams to the display devices by using the identifications.

DETAILED DESCRIPTION OF THE INVENTION

Figure 1:
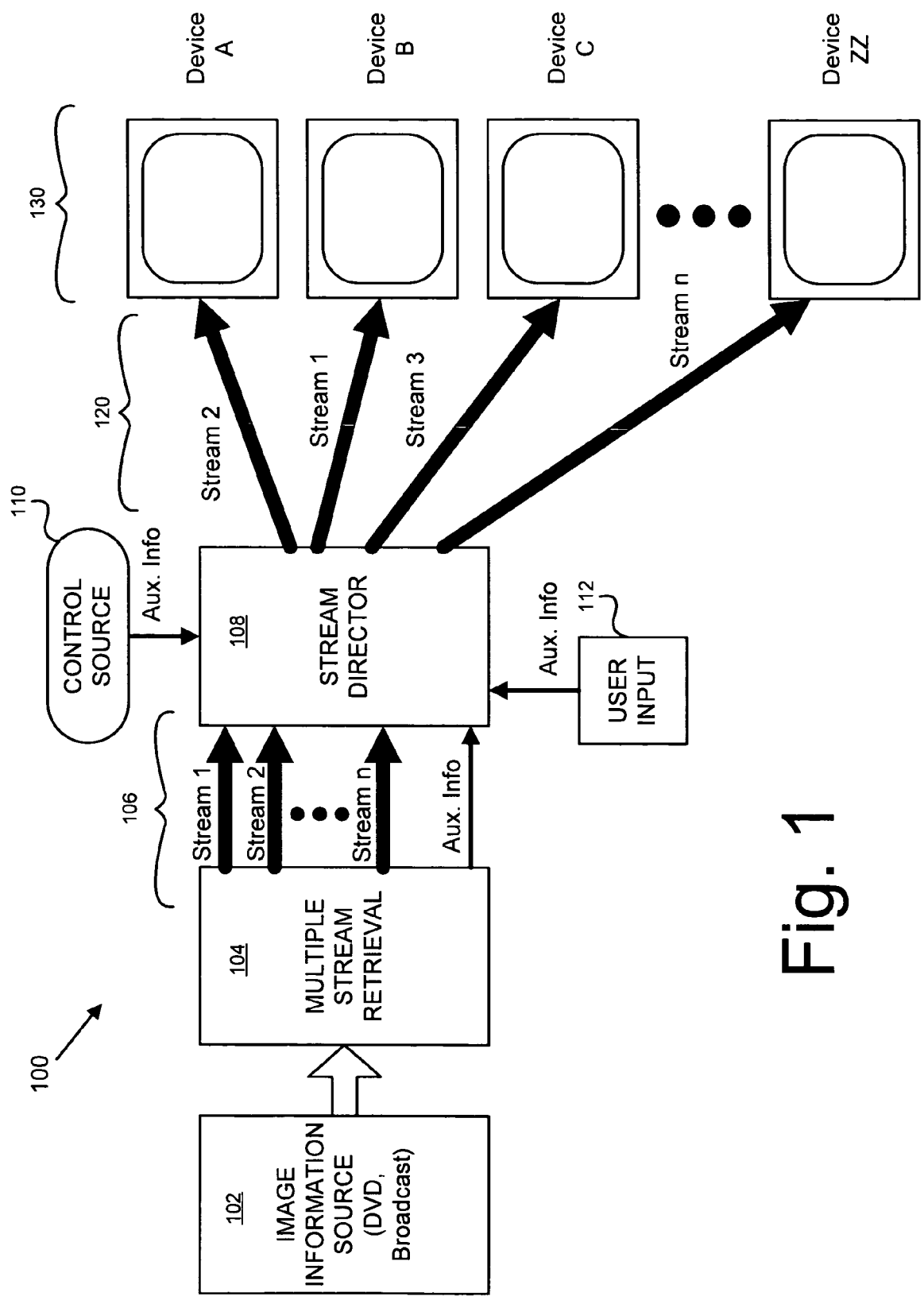
FIG. 1 is a block diagram of a preferred embodiment of the invention.

FIG. 1 is a diagram showing the basic approach of the invention.

In FIG. 1, image information source 102 provides content such as broadcast or pre-stored digital video data. Multiple streams are derived from the video data by retrieval hardware 104. The multiple streams are shown as "Stream 1," "Stream 2," . . . "Stream n" in FIG. 1. Naturally, any number and type of streams can be used. Different applications may used different types of streams, such as broadcast "channels," hard-wired "feeds," etc. A preferred embodiment also includes auxiliary information with the streams. The auxiliary information can be included with the same carrier as the video stream information (e.g., embedded with the video signal) or it can be provided as a distinct signal, or any other suitable approach may be used. One possibility is to use standard "sub-picture" information to carry auxiliary data about an associated stream.

The stream and auxiliary data are provided to stream director 108. Stream director 108 directs the input streams among two or more display devices 130. The directed streams at 120 do not have to correspond to the arrangement or number of the input streams at 106. In other words, streams can be directed to display devices arbitrarily and dynamically. Also, it is not necessary to direct all streams. Some streams can be selectively suppressed. A single stream can be sent to multiple devices. Streams can be combined into a single display device. Other variations may be possible.

Other possible sources for auxiliary, or other, signals include control source 110 and user input device 112. Control source 110 can be an external device or an information source such as a local network, the Internet, etc. A preferred embodiment uses a typical television remote control as a user input device and can allow a user to select streams for viewing or allow directing a specific stream to a specific display device. Combinations of automated and manual (i.e., user controlled) stream direction can be used.

For example, the auxiliary information associated with a stream can describe what type of camera angle or view of a scene is contained within the stream. This allows a multi-screen "expanded" panoramic display (or "panoramic video") to be created by assigning multiple streams to their respectively positioned display devices. For example, three screens can be used in a "left," "center" and "right" arrangement as is known in the art. Then, left, center and right video streams can automatically be steered to their respective displays.

Figure 2:
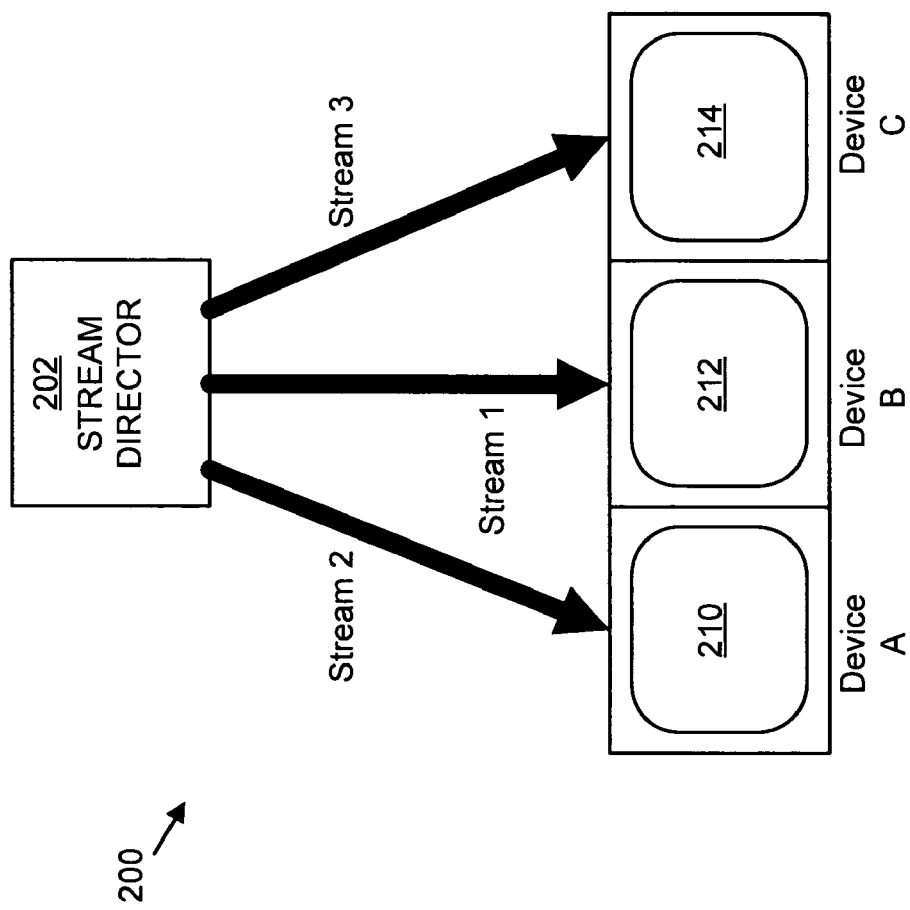
FIG. 2 illustrates a panoramic video feature of the invention.

Such a panoramic video arrangement is shown in FIG. 2.

In FIG. 2, system 200 is a portion of the system 100 of FIG. 1. System 200 includes stream director 202 that can be controlled by the means discussed, above, for FIG. 1. Three streams "Stream 1," "Stream 2" and "Stream 3" are detected and, using associated auxiliary information, directed to appropriate display devices "A," "B" and "C" positioned as left, center and right displays, respectively. Display device positioning can be communicated to stream director 202 by any suitable means. For example, hardwired connectors on a physical enclosure housing stream director 202 can be pre-assigned with left, center and right display outputs. Or a user can manually configure connections for different displays. Displays and their positions can be detected automatically. Other approaches can be used.

Note that any number and position of display devices can be used. Also, display devices can be any aspect ratio or shape. Display devices can also be any suitable type such as liquid crystal display (LCD), cathode ray tube (CRT), organic light-emitting polymer (OLEP), plasma display, etc.

Stream information can come from multiple content sources. For example, data from the Internet can be used to comprise a stream. Such data can, itself, be video (e.g., MPEG-4 format), can be computer generated images, text, web page information, etc. This allows a user to specially configure a viewing environment. In a first example, a user can use three screens to view a music video. A first screen can display a specific band member of the music video, a second screen can display an overall stage view of a performance and a third screen can display a close up of a musician's hands playing an instrument. In a second example, a user can use 5 screen to view a sporting event. Three screens can be set up as left, center, right displays for panoramic video, a fourth screen can be designated to display a particular player who is recorded with a dedicated camera and video stream, and the fifth screen can display a team's performance statistics as obtained from the Internet.

Although the invention has been described with reference to specific embodiments thereof, these embodiments are merely illustrative, and not restrictive, of the invention. For example, although the invention is discussed primarily with respect to digital video, any type of image information format can be employed, including analog formats. Although a preferred embodiment contemplates obtaining streams from a DVD, any source of information can be used including any type of video player, television set (TV) set-top box (e.g., cable/TV/Satellite), etc. Various digital transmission systems, formats; encoding, encryption or compression approaches; etc., may be used with the present invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places through out this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. A method for displaying first, second and third video stream information from a video player, the method comprising:
   detecting the first video stream and associated first stream identification indicating that the first stream is a left stream;
   detecting the second video stream and associated second stream identification indicating that the second stream is a center stream;
   detecting the third video stream and associated third stream identification indicating that the third stream is a right stream;
   detecting a first display device and associated first display device position identification indicating that the first display device is to a left location;
   detecting a second display device, and associated second display device position identification indicating that the second display device is a center location;
   detecting a third display device and associated third display device position identification indicating that the third display device is a right location;
   directing the video streams to the display devices in a first assignment by using the first, second, and third stream identifications and the first second, and third display device position identifications so that the first stream is displayed on the first display device, the second stream is displayed on the second display device, and the third stream is displayed on the third display device to result in a panoramic view that includes three different portions of a same scene, wherein each portion is displayed on a different one of the first, second and third display devices; and
   accepting a signal from a user input device to modify the directing of the video streams to the display devices to produce a different assignment of streams to display devices.

2. The method of claim 1, wherein the step of directing the video streams includes automatic direction of the streams to the display devices.

3. The method of claim 1, wherein the step of directing the video streams includes manual direction of the streams to the display devices.

4. The method of claim 3, wherein the step of directing the video streams includes substeps of
   obtaining a signal from a user input device; and
   using the obtained signal to direct a video stream to a display device.

5. The method of claim 1, wherein a display device includes a display screen.

6. The method of claim 1, wherein a video stream is obtained from a DVD.

7. The method of claim 1, wherein a video stream is obtained from a broadcast.

8. The method of claim 7, wherein the broadcast includes information from a satellite transmission.

9. The method of claim 7, wherein the broadcast includes information from a cable transmission.

10. The method of claim 7, wherein the broadcast includes information from a radio-frequency transmission.

11. The method of claim 7, wherein the broadcast includes information from the Internet.

12. The method of claim 1, wherein auxiliary stream information is associated with a given video stream, the method further comprising
   using the auxiliary stream information to identify a preferred position of the given video stream.

13. The method of claim 12, wherein auxiliary display device information is associated with a given display device, the method further comprising
   using the auxiliary display device information to identify a position of the given display device with respect to a viewer's viewpoint.

14. The method of claim 13, further comprising
   determining that the preferred position corresponds with the position of the given display device; and
   directing the given video stream to be displayed on the given display device.

15. The method of claim 1, wherein the panoramic view is of a music video, the method further comprising:
   accepting signals from the user input device to display a specific band member on the first display device, an overall stage view on the second display device and a close-up of a musician's hands playing an instrument on the third display device.

16. The method of claim 1, wherein the panoramic view is of a sporting event, the method further comprising:
   accepting signals from the user input device to display a particular player on a fourth display screen and to display performance statistics on a fifth display screen.

17. A method for directing multiple streams of video information, the method comprising:
   receiving an indication that a first display device is positioned as a left display device;
   receiving an indication that a second display device is positioned as a right display device;
   detecting a first video stream and associated auxiliary information indicating that the first stream is a left stream;

detecting a second video stream and associated auxiliary information indicating that the second stream is a right stream;

at least partly in response to the indication that the first display device is positioned as the left display device and the auxiliary information indicating that the first stream is a left stream, directing the first stream to the first display device;

at least partly in response to the indication that the second display device is positioned as the right display device and the auxiliary information indicating that the second stream is a right stream, directing the second stream to the second display device;

receiving an indication that a third display device is positioned as a center display device; detecting a third video stream and associated auxiliary information indicating that the third stream is a center stream; and at least partly in response to the indication that the third display device is positioned as the center display device and the auxiliary information indicating that the third stream is a center stream, directing the third stream to the third display device; wherein directing the first stream to the first display device, directing the second stream to the second display device, and directing the third stream to the third display device results in a panoramic view that includes three different portions of a same scene, wherein each portion is displayed on a different one of the first, second and third display devices.

18. The method of claim 17, wherein the first stream is automatically directed to the first display device, and the second stream is automatically directed to the second display device.

19. The method of claim 17, the method further comprising redirecting the first stream and the second stream in response to a signal from a remote control device.

20. The method of claim 17, wherein the first stream is received via the Internet.

21. The method of claim 17, wherein the first stream is received from a DVD or cable.

22. The method of claim 17, wherein the auxiliary information indicating that the first stream is a left stream is embedded in a video signal included in the first video stream.

23. The method of claim 17, wherein the auxiliary information indicating that the first stream is a left stream is provided via sub-picture information.

24. The method of claim 17, the method further comprising:
accepting signals from a user input device to display an athlete on a third display screen and to display performance statistics on a fourth display screen.

25. A non-transitory tangible computer-readable medium having computer-executable instructions stored thereon that, if executed by a computing device, cause the computing device to perform a method comprising:
receiving an indication that a first display device is positioned as a left display device;
receiving an indication that a second display device is positioned as a right display device;
detecting a first video stream and associated auxiliary information indicating that the first stream is a left stream;
detecting a second video stream and associated auxiliary information indicating that the second stream is a right stream;
at least partly in response to the indication that the first display device is positioned as the left display device and the auxiliary information indicating that the first stream is a left stream, directing the first stream to the first display device;
at least partly in response to the indication that the second display device is positioned as the right display device and the auxiliary information indicating that the second stream is a right stream, directing the second stream to the second display device;
receiving an indication that a third display device is positioned as a center display device; detecting a third video stream and associated auxiliary information indicating that the third stream is a center stream; and at least partly in response to the indication that the third display device is positioned as the center display device and the auxiliary information indicating that the third stream is a center stream, directing the third stream to the third display device; wherein directing the first stream to the first display device, directing the second stream to the second display device, and directing the third stream to the third display device results in a panoramic view that includes three different portions of a same scene, wherein each portion is displayed on a different one of the first, second and third display devices.

26. The tangible computer-readable medium of claim 25, the method further comprising automatically directing the first stream to the first display device, and the second stream to the second display device.

27. The tangible computer-readable medium of claim 25, the method further comprising redirecting the first stream and the second stream in response to a signal from a remote control device.

28. The tangible computer-readable medium of claim 25, wherein the auxiliary information indicating that the first stream is a left stream is embedded in a video signal included in the first video stream.

29. The tangible computer-readable medium of claim 25, wherein the auxiliary information indicating that the first stream is a left stream is provided via sub-picture information.

30. The tangible computer-readable medium of claim 25, the method further comprising:
accepting signals from a user input device to display an athlete on a third display screen and to display performance statistics on a fourth display screen.

31. An apparatus for directing multiple streams of video information, comprising:
one or more inputs configured to receive at least:
an indication that a first display device is positioned as a left display device;
an indication that a second display device is positioned as a right display device;
an indication that a third display device is positioned as a center display device;
a first video stream;
auxiliary information associated with the first video stream indicating that the first video stream is a left stream;
a second video stream;
auxiliary information associated with the second video stream indicating that the second video stream is a right stream a third video stream; auxiliary information associated with the third video indicating that the third video stream is a center stream;
wherein the apparatus is configured to direct the first stream to the first display device at least partly in response to the indication that the first display device is positioned as the left display device and the auxiliary information indicating that the first stream is a left stream; and wherein the apparatus is configured to direct the second stream to the second display device at least partly in response to the indication that the second display device is positioned as the right display device and the auxiliary information indicating that the second stream is a right stream;

wherein the apparatus is configured to direct the first stream to the first display device at least partly in response to the indication that the first display device is positioned as the left display device and the auxiliary information indicating that the first stream is a left stream; and wherein the apparatus is configured to direct the second stream to the second display device at least partly in response to the indication that the second display device is positioned as the right display device and the auxiliary information indicating that the second stream is a right stream; wherein the apparatus is configured to direct the third stream to the third display device at least partly in response to the indication that the third display device is positioned as the center display device and the auxiliary information indicating that the third stream is a center stream, to thereby cause a panoramic view that includes three different portions of a same scene to be displayed, wherein each portion is displayed on a different one of the first, second and third display devices.

32. The apparatus of claim 31, wherein the apparatus is configured to automatically direct the first stream to the first display device, and the second stream to the second display device.

33. The apparatus of claim 31, wherein the apparatus is configured to redirect the first stream and the second stream in response to a signal from a remote control device.

34. The apparatus of claim 31, wherein the apparatus is configured to receive the auxiliary information indicating that the first stream is a left stream via information embedded in a video signal included in the first video stream.

35. The apparatus of claim 31, wherein the apparatus is configured to receive the auxiliary information indicating that the first stream is a left stream via sub-picture information.

* * * * *

UNITED STATES PATENT AND TRADEMARK OFFICE
CERTIFICATE OF CORRECTION

| | |
|---|---|
| PATENT NO. | : 8,165,448 B2 |
| APPLICATION NO. | : 10/807863 |
| DATED | : April 24, 2012 |
| INVENTOR(S) | : Braun |

It is certified that error appears in the above-identified patent and that said Letters Patent is hereby corrected as shown below:

In the Specifications:
In Column 4, Line 28, delete "through out" and insert -- throughout --, therefor.

In the Claims:
In Column 5, Line 59, in Claim 1, delete "first" and insert -- first, --, therefor.

Signed and Sealed this
Second Day of October, 2012

David J. Kappos
*Director of the United States Patent and Trademark Office*